US012803365B2

(12) United States Patent
Lupelow

(10) Patent No.: US 12,803,365 B2
(45) Date of Patent: Nov. 17, 2026

(54) ELECTRIC MOTOR END CAP HAVING DUST PASSAGE

(71) Applicant: Graco Minnesota Inc., Minneapolis, MN (US)

(72) Inventor: Michael J. Lupelow, Dayton, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 303 days.

(21) Appl. No.: 18/712,040

(22) PCT Filed: Nov. 16, 2022

(86) PCT No.: PCT/US2022/050063
§ 371 (c)(1),
(2) Date: May 21, 2024

(87) PCT Pub. No.: WO2023/096796
PCT Pub. Date: Jun. 1, 2023

(65) Prior Publication Data
US 2025/0023416 A1 Jan. 16, 2025

Related U.S. Application Data

(60) Provisional application No. 63/282,582, filed on Nov. 23, 2021.

(51) Int. Cl.
*H02K 5/14* (2006.01)
*H02K 5/173* (2006.01)

(52) U.S. Cl.
CPC ........... *H02K 5/148* (2013.01); *H02K 5/1732* (2013.01)

(58) Field of Classification Search
CPC ........ H02K 5/148; H02K 5/1732; H02K 9/28; H02K 9/06; H02K 13/006; H01R 39/46
USPC .......................................................... 310/239
See application file for complete search history.

(56) References Cited

U.S. PATENT DOCUMENTS

| | | | | |
|---|---|---|---|---|
| 2,628,320 | A | 2/1953 | Humphrey | |
| 6,417,595 | B1 | 7/2002 | Wasson | |
| 8,049,380 | B2 * | 11/2011 | Li | H02K 9/28 310/227 |
| 2006/0175925 | A1 | 8/2006 | Coles | |

FOREIGN PATENT DOCUMENTS

| | | | |
|---|---|---|---|
| CN | 201332331 | * | 10/2009 |
| CN | 201332331 | Y | 10/2009 |
| JP | S51106808 | U | 8/1976 |
| JP | S5313205 | U | 2/1978 |
| JP | S51106808 | * | 8/1979 |

OTHER PUBLICATIONS

International Search Report and Written Opinion for PCT Application No. PCT/US2022/050063, Dated Mar. 15, 2023, pp. 30.
International Preliminary Report on Patentability for PCT Application No. PCT/US2022/050063, Dated Jun. 6, 2024, pp. 19.

* cited by examiner

*Primary Examiner* — Ahmed Elnakib
(74) *Attorney, Agent, or Firm* — Kinney & Lange

(57) ABSTRACT

A motor end cap for a brushed direct current (DC) electric motor includes dust passages extending therethrough that facilitate dust migration out of the motor. The brush dust migrates from an interior of the motor to outside of the motor at least partially through the dust passages formed in the motor end cap.

19 Claims, 10 Drawing Sheets

ELECTRIC MOTOR END CAP HAVING DUST PASSAGE

CROSS-REFERENCE TO RELATED APPLICATION(S)

This application is a 371 national phase application of International Application No. PCT/US2022/050063 filed Nov. 16, 2022 and entitled "ELECTRIC MOTOR END CAP HAVING DUST PASSAGE," which claims priority to U.S. Provisional Application No. 63/282,582 filed Nov. 23, 2021 and entitled "ELECTRIC MOTOR HAVING BRUSH SEAL DUST PASSAGE," the disclosures of which are hereby incorporated by reference in their entireties.

BACKGROUND

The present disclosure relates generally to electric motors. More specifically, the present disclosure relates to brushed direct current (DC) motors.

Brushed DC motors utilize brushes that interface with a commutator to provide driving electrical energy that causes rotation of the motor rotor. Direct current power is provided to the brushes, usually made from graphite or carbon, that are in contact with the rotating commutator. The commutator rapidly reverses the polarity of the direct current supplied through the brushes. The commutator rotating relative to the brushes generates dust from the brushes that can accumulate within the motor. The dust can be charged and such dust can come into contact with conductive components and cause shorting of the motor and can cause undesirable electrical arcing.

SUMMARY

According to an aspect of the disclosure, an end cap for a motor housing of an electric motor includes a cap body having an inner side and an outer side, the cap body disposed about a cap axis and at least partially defining a cap cavity on an interior of the cap body; and a dust passage extending between the cap cavity and the outer side, the dust passage configured to permit dust to migrate from out of the interior of the cap body through the dust passage.

According to an additional or alternative aspect of the disclosure, an end cap for a motor housing of an electric motor includes a cap body and a dust passage. The cap body includes an inner side; an outer side; an inner collar at least partially defining a commutator cavity configured to at least partially surround a commutator of the electric motor; and an outer collar disposed radially outward from the inner collar. The dust passage extending at least partially within the inner collar and from the commutator cavity to the outer side, the dust passage defining a flowpath for brush dust to migrate from the commutator cavity to the outer side.

According to another additional or alternative aspect of the disclosure, an end cap for a motor housing of an electric motor includes a cap body having an inner side and an outer side, the cap body defining a cap cavity within an interior of the cap body, the cap cavity including bearing cavity configured to receive a bearing of the electric motor; and a dust passage extending from the outer side to the cap cavity and spaced radially outward from the bearing cavity, the dust passage configured to permit dust to migrate from the cap cavity to the outer side through the dust passage.

According to yet another additional or alternative aspect of the disclosure, an end cap for a motor housing of an electric motor includes an inner collar disposed around a cap axis and defining a cap cavity and a dust passage. The inner collar includes a cavity surface extending at least partially defining a radial exterior of the cap cavity; a cavity wall extending inward from the cavity surface and towards the cap axis; and a dust seal projecting axially from the cavity wall and extending annularly about the cap axis. The dust passage extending between a passage inlet open to the cap cavity and a passage outlet open on an exterior of the end cap, the passage inlet disposed radially between the dust seal and the cavity surface.

According to yet another additional or alternative aspect of the disclosure, a brushed direct current electric motor includes a drive shaft configured to rotate on a motor axis; a commutator mounted on the drive shaft; at least one conductive brush in contact with the commutator, the commutator configured to rotate relative to the conductive brush; and a motor housing at least partially surrounding the commutator and the drive shaft. The motor housing includes a wall unit, the wall unit having a first seal; an end cap disposed at an end of the wall unit; and at least one dust passage. A commutator cavity exists radially inward of the motor housing and outward of the commutator and axially between the first seal and the second seal, and the at least one dust passage allows passage of dust from the conductive brush to escape from the commutator cavity to outside of the motor housing.

DETAILED DESCRIPTION

The present disclosure generally concerns brushed electric motors having one or more dust passages to provide flowpaths for brush dust to migrate out from an interior of the motor. Use of such motors will be explained in the context of fluid sprayers, such as paint sprayers where such features can be particularly beneficial, however the motor features discussed herein can be implemented in various other applications, including non-sprayers, non-pumps, and other machines driven by electric motors. Features discussed herein are particularly useful on universal and direct current (DC) brushed motors; it is understood, however, that the features can be utilized in other types of electric motor designs as well.

Figure 1A:
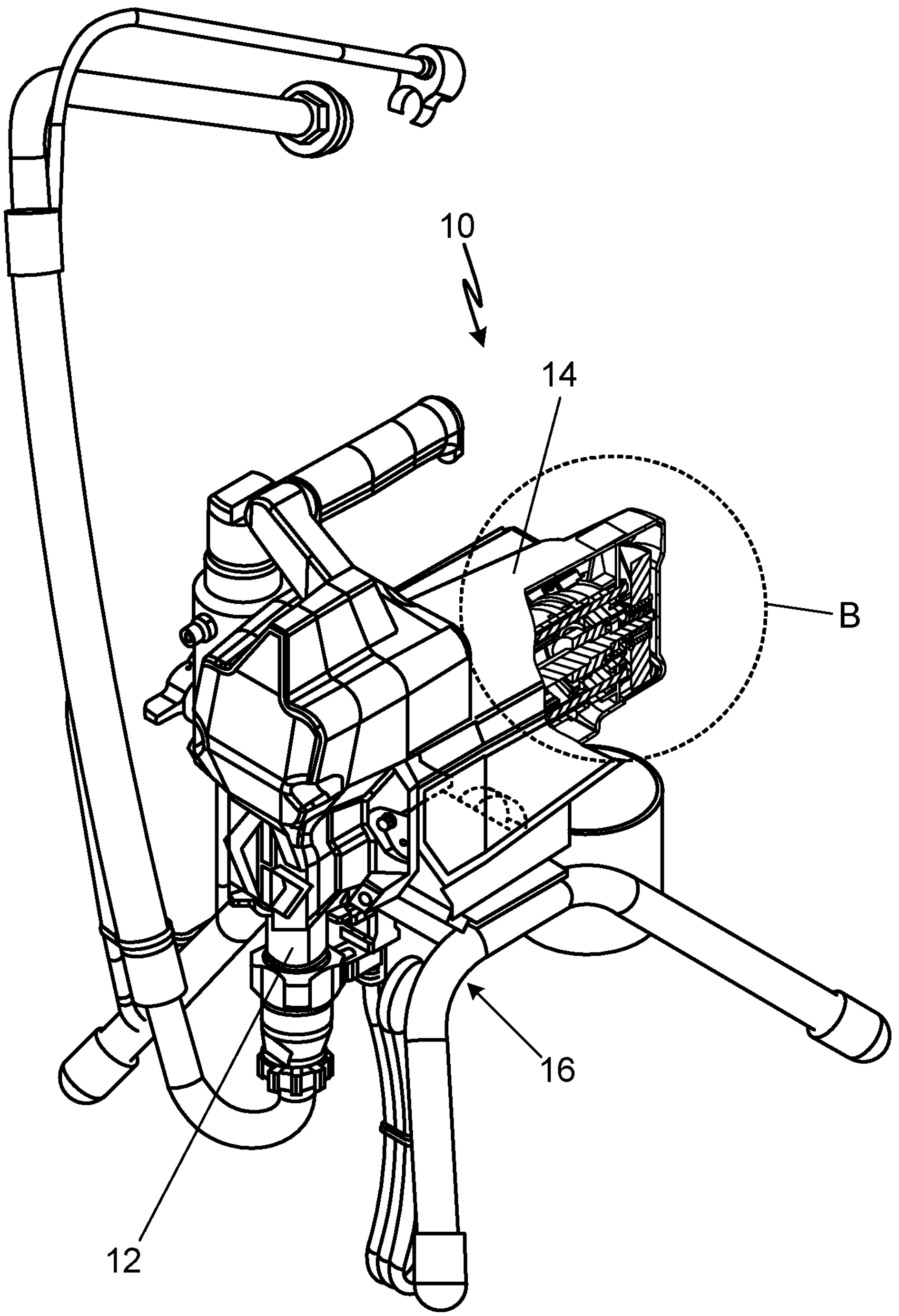
FIG. 1A is an isometric view of a displacement assembly showing a cross-section of a portion of the displacement assembly.
Figure 1B:
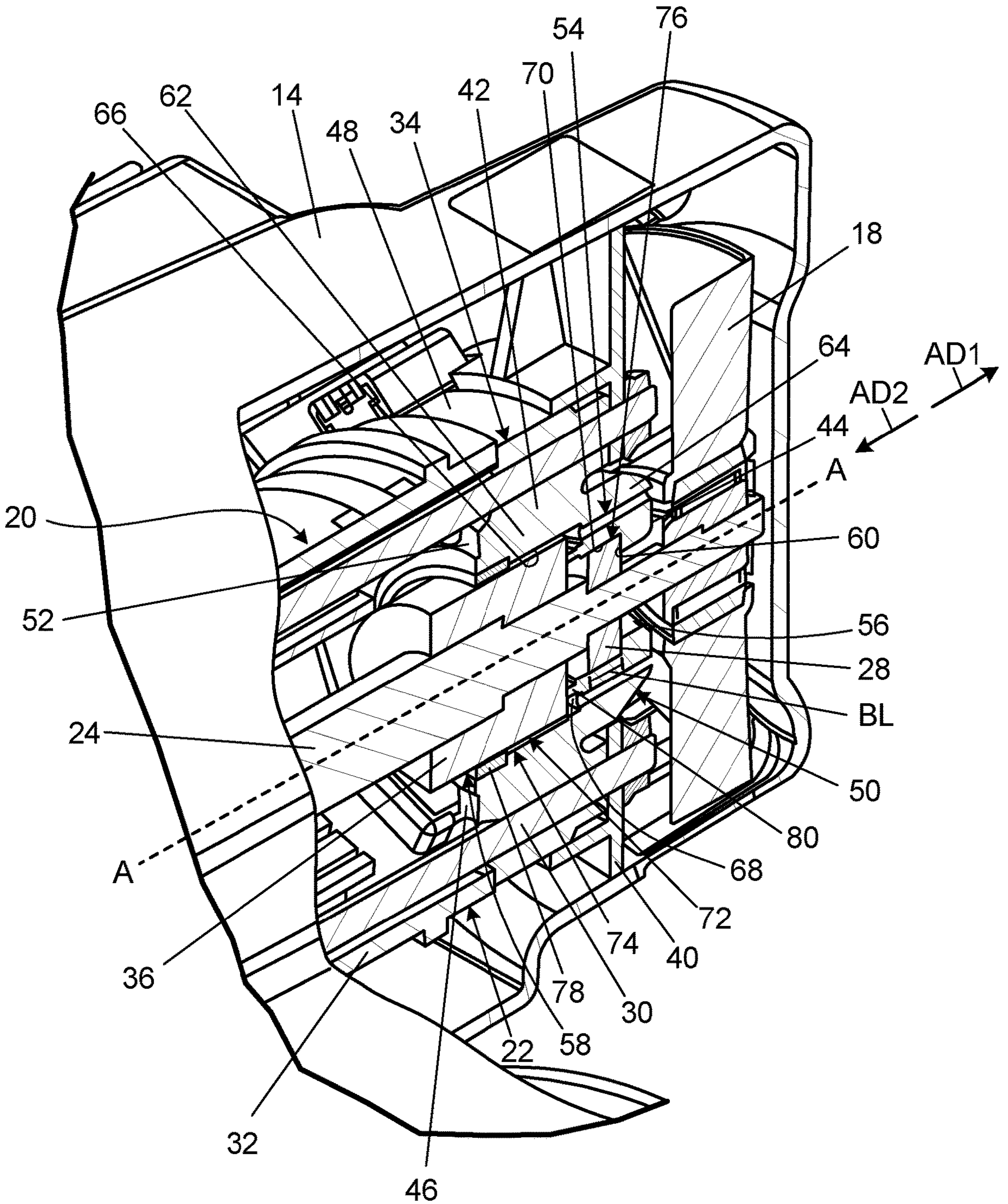
FIG. 1B is an enlarged view of detail B in FIG. 1A.
Figure 2A:
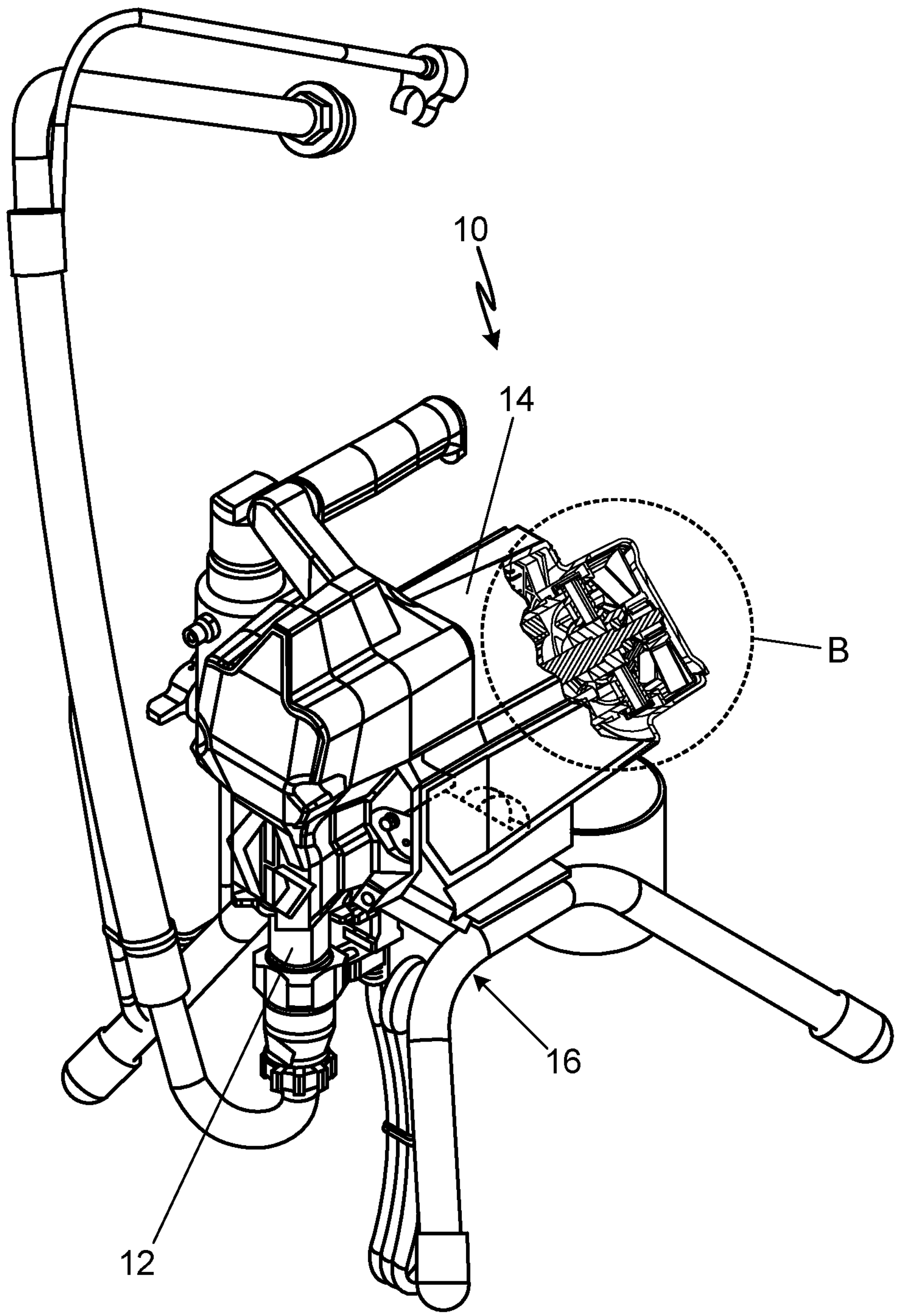
FIG. 2A is an isometric view of the displacement assembly in FIG. 1A showing a second cross-section of the portion of the displacement assembly.
Figure 2B:
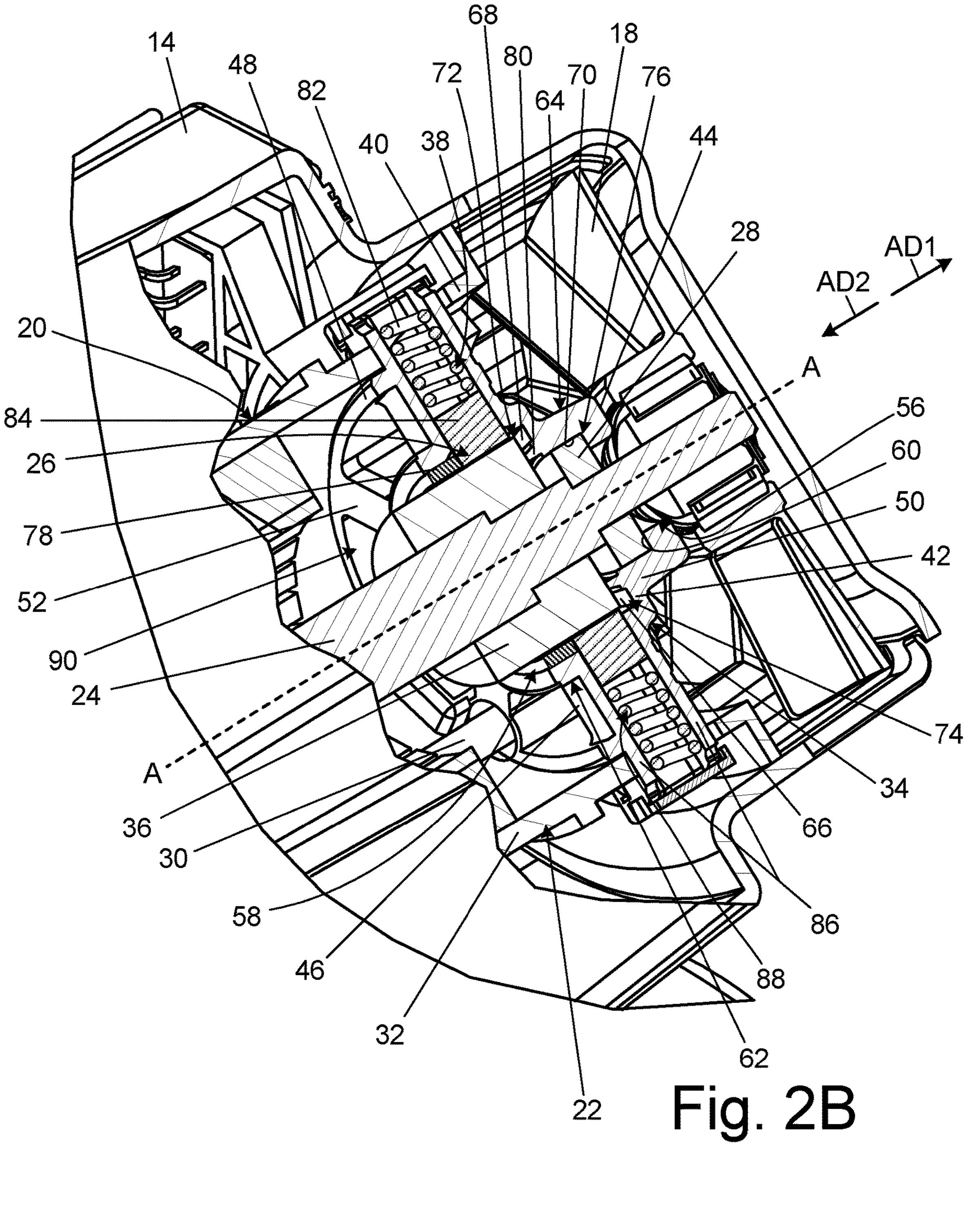
FIG. 2B is an enlarged view of detail B in FIG. 2A.

FIG. 1A is an isometric view of displacement assembly 10 showing a first cross-sectional view of a portion of displacement assembly 10. FIG. 1B is an enlarged view of detail B in FIG. 1A. FIG. 2A is an isometric view of displacement assembly 10 showing a second cross-section of the portion displacement assembly 10. FIG. 2B is an enlarged view of detail B in FIG. 2A. FIGS. 1A-2B will be discussed together.

Displacement assembly 10 includes pump 12, shroud 14, frame 16, fan 18, and electric motor 20. The section views in FIGS. 1B and 2B show portions of motor 20. Motor housing 22, drive shaft 24, commutator assembly 26, bearing 28, and fasteners 30 of motor 20 are shown. Wall unit 32 and end cap 34 of motor housing 22 are shown. Commutator assembly 26 includes commutator 36 and brush assemblies 38. End cap 34 includes outer side 44, inner side 46, outer collar 48, inner collar 50, ribs 52, dust passages 54, outer aperture 56, and inner aperture 58. Inner collar 50 includes commutator collar 62 and bearing collar 64. Inner collar 50 further includes cavity surface 66, cavity wall 68, and support surface 70.

Motor 20 is configured to receive electrical inputs and generate a mechanical output. In the example shown, motor 20 is a component of displacement assembly 10 that is configured as a pumping assembly configured to pump liquid, such as paints, coatings, etc., from an upstream source to a downstream location. Specifically, the displacement assembly 10 is shown as a spray assembly configured to pump liquids for spray application on a substrate. A spray gun can be fluidly connected to pump 12 by a hose to receive fluid from pump 12 and emit the fluid as a spray. It is understood, however, that motor 20 can be utilized in any desired displacement assembly 10 to generate a mechanical output from an electrical input.

Frame 16 supports shroud 14 relative to a support surface, such as a ground surface. Frame 16 includes legs that extend to and can contact the support surface.

Pump 12 is supported by frame 16. Pump 12 is operatively connected to motor 20 to be powered by motor 20. For example, a piston of pump 12 can be connected to a drive that converts a rotational output from motor 20 to a reciprocating linear input to a fluid displacer of the pump 12, such as a piston. For example, the drive can include an eccentric crank, among other options. Motor 20 is supported by frame 16. Motor 20 is configured to generate a rotating mechanical output on axis AA.

Motor 20 is located coaxial with the axis AA, which is also the axis of rotation of the rotor of the motor 20. Orthogonal to the axis AA is a radial direction R, which can be any direction 360-degrees orthogonal to the axis AA. Axial, as used herein, is along axis AA, and radial, as used herein, is in a radial direction R orthogonal to the axis AA. Components can be considered to radially overlap when those components are disposed at common axial locations along axis AA. A radial line extending orthogonally from axis AA will extend through each of the radially overlapping components. Components can be considered to axially overlap when those components are disposed at common radial and circumferential locations such that an axial line parallel to axis AA extends through the axially overlapping components. Components can be considered to circumferentially overlap when aligned about axis AA, such that a circle centered on axis AA passes through the circumferentially overlapping components.

The electric motor 20 is inside of shroud 14. Most or all parts of the motor 20 are contained within a motor housing 22. Wall unit 32 and motor end cap 34 of motor housing 22 are shown. Motor housing 22 can be considered to form a cylindrical housing. Motor housing 22 is disposed within shroud 14. Examples of motor housing 22 can be supported relative to shroud 14 by mounting bracket 40. Fasteners 30 extend through the mounting bracket 40 and end cap 34 to secure electric motor 20 relative to shroud 14.

Motor housing 22 can be formed as or include a thin-walled hollow wall unit 32 opened at both ends. Wall unit 32 can be cylindrical, among other options. Motor end cap 34 is connected to the wall unit 32 at one axial end of the wall unit 32. The connection of the end cap 34 and the wall unit 32 can be by way of fasteners, such as a nut and bolt fastening system, that forms a permanent or removable connection therebetween.

Extending through the electric motor 20 is drive shaft 24. Drive shaft 24 is coaxial with the axis AA. In the example shown, drive shaft 24 extends through end cap 34 such that drive shaft 24 projects axially beyond outer side 44 of end cap 34. It is understood, however, that not all examples are so limited. For example, some examples include a drive shaft 24 that does not extend fully through end cap 34. Some examples of end cap 34 are closed on outer side 44 such that drive shaft 24 cannot extend fully through end cap 34. The drive shaft 24 can project axially outward from end cap 34. In the example shown, drive shaft 24 projects fully axially through end cap 34. Specifically, drive shaft 24 extends fully axially through outer aperture 56 formed in end cap 34.

In the example shown, fan 18 is mounted on the end of drive shaft 24. Fan 18 rotates with the rotor of the electric motor 20 to cool the electric motor 20, however various other embodiments may not include a fan 18. Fan 18 can, in some examples, generate a low pressure zone outside of motor 20 that can assist in drawing brush dust out of motor 20 through dust passages 54 in end cap 34.

Drive shaft 24 is rotatably supported by a plurality of bearings, including bearing 28. Bearing 28 can include a plurality of balls surrounded by two runs that contain the balls, the runs having relative rotation therebetween. Bearing 28 may instead be a pin or roller bearing, or another type of known bearing. Bearing 28 can also be referred to as a front bearing. Bearing 28 is secured in a central portion of end cap 34. End cap 34 supports bearing 28. In the example shown, an inner run of the bearing is mounted on the drive shaft 24 and an outer run of the bearing 28 is mounted to end cap 34. Bearing 28 interfaces with shoulder 60 of end cap 34 to mount bearing 28 to end cap 34.

Shoulder 60 is a portion of end cap 34 that extends radially inward to interfere with axial movement of bearing 28. Shoulder 60 is configured to inhibit axial movement of bearing 28 in first axial direction AD1 along axis AA. Shoulder 60 extends to axially overlap with bearing 28.

Electric motor 20 includes a commutator assembly 26. Commutator assembly 26 includes commutator 36 and brush assemblies 38. The brush assemblies 38 each include brush springs 82 and conductive brushes 84.

In the example shown, end cap 34 radially surrounds at least part of the commutator 36. In the example shown, the brush assemblies 38 are mounted at least partially within the end cap 34. It is understood, however, that not all examples are so limited. In some examples, brush assemblies 38 may not be integrated into the end cap 34. For example, brush assemblies 38 can be supported by another structure separate from end cap 34. Although not shown but common on direct current (DC) and universal electric motors are an armature and one or more magnets. The one or more magnets are typically stationary while the armature rotates. The armature can be formed from a plurality of coil windings which generate electromagnetic fields when current passes through the coils. Electromagnetic fields interact with magnets (permanent or electromagnetic) of a stator of the electric motor 20 across an air gap separating the rotor from the stator to accelerate the rotor relative to the stator. The commutator 36 and the armature rotate together on the drive shaft 24.

In some examples, motor 20 can include a pair of permanent magnets that provide a north and south polar relation. The permanent magnets can be of substantially the same size. The permanent magnets are provided on the inner surface of the wall unit 32 at an equal radial pitch. Some examples can include a plurality of permanent magnet pairs that provide north and south polar relation. The armature can include a laminated iron core provided in its outer peripheral portion with a plurality of axial slots, formed at a constant radial pitch, and a coated wire wound in the axial slots. The armature can also include an iron-less winding with coated wire. For example, the wires can be formed from copper or another conductive metal. The armature is mounted on the portion of the drive shaft 24 opposed to the permanent magnets with the air gap between concaved inner peripheral surfaces of the permanent magnets and the outer peripheral surface of the armature. The armature and the commutator 36 can be axially mounted on the drive shaft 24 in an adjacent position in relation to each other. The drive shaft 24 is located at least partially within the motor housing 22 in such a manner that the armature is radially overlapped with the permanent magnets.

Generally, alternating current is used to generate the electromagnetic fields across the air gap of an electric motor 20 to push and/or pull the magnets as various portions of the armature passes each magnet in rotation. Generally, the electric motor is applied with direct current. The commutator 36 is used to rapidly reverse the polarity of the direct current supplied to the armature resulting in rapidly reversing (alternating) current in the coil windings of the armature in time with the armature passing by the magnets, which results in driving force to cause rotation of the armature.

The commutator 36 can include an annular array of a plurality of conductive, typically copper, tabs on its cylindrical exterior. For example, the commutator 36 can include a plurality of copper elongate strips arranged at a constant radial pitch. The plurality of conductive axial tabs electrically connect with terminals of the armature coils. The commutator 36 is mounted on the drive shaft 24 and can be adjacent to the armature. The commutator 36 and the armature can be electrically connected to each other by way of a winding connection.

Brush assemblies 38 are in contact with the commutator 36. Brush assemblies 38 are configured to provide direct current to commutator 36. Brushes 84 are formed from conductive material, such as carbon, such as graphite. Brushes 84 are supplied with direct current and provide the direct current to the commutator 36. Brushes 84 physically interface with the commutator 36. Specifically, the brushes 84 are held in place and in contact with the commutator 36 as the commutator 36 rotates to expose different ones of the conductive tabs of commutator 36 to brushes 84 to pass the direct current to the commutator 36 and the armature while continuously reversing the current through the coils of the armature due to the rotation of the commutator 36, thereby generating the driving power to drive rotation of the motor rotor of the motor 20.

In the example shown, commutator assembly 26 includes two brushes 84, however another number of brushes 84 may be present. A brush 84 can be a structure that makes intermittent contact with rotating terminals to convey electrical energy. For example, a brush can be a wisk or other collection of elongate wires. In another example, a brush can be a pad of material, and in such case may not be a wisk or other collection of elongate wires. In this embodiment, the two brushes 84 disposed on opposite radial sides from each other relative to the axis of the drive shaft 24. The two brushes 84 are disposed 180-degrees about axis AA from each other in the example shown. Brush assemblies 38 each include a brush 84. Brush assemblies 38 are supported by end cap 34, in the example shown. The brush springs 82 and conductive brushes 84 are positioned between brush assembly walls 86. In the example shown, brush assembly walls 86 are formed by portions of end cap 34. Brush assembly walls 86 extend radially outward from inner collar 50 of end cap 34 to outer collar 48 of end cap 34. In the example shown, brush assembly walls 86 project radially outward beyond outer collar 48. The brush assembly walls 86 are formed in end cap 34 in the example shown. Brush assembly walls 86 extend away from drive shaft 24. Brush assembly walls 86 can extend orthogonal to shaft axis A-A. Brush springs 82 and conductive brushes 84 are disposed in the brush cavities 88 defined by brush assembly walls 86. The brush assembly walls 86 and the conductive brushes 84 have a close tolerance fit. Brush cavities 88 can be substantially tube shaped and can be substantially the same size. The brush assemblies 38 can be at an equal radial pitch, and can be generally positioned 180-degrees relative to each other about the drive shaft 24.

The conductive brushes 84 are biased by brush springs 82 onto the peripheral surface of the commutator 36 at a suitable pressure to thereby supply electric power to the commutator 36. In the example shown, brushes 84 are mounted in the end cap 34, and exposed inside the commutator cavity 74 to make contact with the commutator 36. The brush springs 82 can be provided in association with each brush 84 to continuously urge the brush 84 towards the commutator 36 to maintain contact with the commutator 36.

Due to the brushes 84 being held static while the commutator 36 rotates, brushes 84 typically wear and generate dust. Being that the dust is generated from a current conducting component, the dust itself can be current conducting and can be charged. The dust can cause an electrical short in some circumstances, resulting in failure of the electric motor 20. For example, the conductive brush dust can flow to and accumulate on the bearing 28. An electrical pathway can be formed through the conductive bearing 28 and the conductive drive shaft 24 to electromagnetic components of motor 20 to cause shorting and failure of electric motor 20. Mitigation of electrical shorting due to accumulation of brush dust is further discussed herein.

End cap 34 forms a portion of motor housing 22. End cap 34 can be molded from a non-conductive material. For example, end cap 34 can be molded from a thermoset or thermoplastic material for inhibiting electrical conductivity. End cap 34 can be formed from single piece of polymer, which may be injection molded. In some examples, end cap 34 may instead be formed from multiple different parts fixed together. It is understood that end cap 34 may be formed from different types of materials. End cap 34 is disposed about a cap axis CA (FIG. 4D). The cap axis CA can be coaxial with axis AA, thought it is understood that not all examples are so limited.

Inner side 46 is a side of cap body 42 configured to be oriented into an interior of motor housing 22 and outer side 44 is a side of cap body 42 configured to be oriented away from the interior of motor housing 22.

Cap body 42 defines various chambers that can be utilized to support or operate various components of motor 20. Cap body 42 defines cap cavity 72 within the interior of end cap 34. In the example shown, cap cavity 72 is formed within inner collar 50.

Dust passages 54 are formed through cap body 42 between cap cavity 72 and outer side 44. Dust passages 54 define flowpaths for brush dust generated by contact between conductive brushes 84 and commutator 36 to flow out of cap cavity 72 and to outer side 44. Dust passages 54 can be sized to prevent environmental intrusion into the interior of motor 20, further protecting motor 20.

Cap body 42 includes inner collar 50 and outer collar 48. In some examples, cap body 42 is formed as a monolithic structure. Inner collar 50 and outer collar 48 are fixedly connected to each other. In the example shown, ribs 52 extend between and connect inner collar 50 and outer collar 48. It is understood, however, that inner collar 50 and outer collar 48 can be connected in any desired manner. In some examples, end cap 34 is configured such that inner collar 50 and outer collar 48 are formed together by solid structure, without intervening ribs 52. Outer collar 48 can be somewhat circular in shape and encompasses the outer edge of the end cap 34. Outer collar 48 provides the point of interface with the wall unit 32.

Ribs 52 are integrally connected to the outer collar 48, and having substantially the same width and length. The plurality of ribs 52 extend radially between the outer collar 48 to the inner collar 50. The plurality of ribs 52 can further extend axially from the outer collar 48 to the inner collar 50. The ribs 52 can be considered to extend angularly from the outer collar 48 to the inner collar 50 in the example shown. In the example shown, ribs 52 extend between outer collar 48 and bearing collar 64. Ribs 52 are further connected to commutator collar 62. The plurality of ribs 52 are integrally connected to the outer collar 48, the commutator collar 62, and the bearing collar 64 for forming and integrally connecting the respective collars. Due to the outer collar 48 having a greater diameter than the commutator collar 62, a radial space is formed between the respective collars. The connection of the plurality of ribs 52 from the outer collar 48 to the bearing collar 64 form voids 90 that allow axial air flow therethrough for cooling of motor 20.

In the example shown, cap cavity 72 is defined by inner collar 50. Cap cavity 72 is formed in an interior of cap body 42. Cavity surface 66 extends axially into cap body 42. Cavity wall 68 extends radially inward from cavity surface 66 to support surface 70. Support surface 70 extends axially from cavity wall 68. Shoulder 60 is formed at an opposite axial end of support surface 70 from cavity wall 68.

In some examples, end cap 34 can be configured as a bearing support that supports bearing 28 of motor 20. End cap 34 can additionally or alternatively be configured as a brush support that supports brush assemblies 38 of commutator assembly 26. Additionally or alternatively, end cap 34 can be configured with outer aperture 56 such that drive shaft 24 can project axially out of end cap 34. In some examples, inner collar 50 can be fully or partially closed on outer side 44 such that drive shaft 24 cannot pass fully through cap body 42. Some additional or alternative examples of end cap 34 can be configured as a commutator housing that at least partially surrounds portions of commutator 36 of motor 20. Commutator 36 can extend into cap cavity 72 through inner aperture 58 that is formed on inner side 46 of cap body 42. The example of end cap 34 shown and discussed includes various features of end cap 34 illustrated and described together, but it is understood that different examples of end cap 34 can include one or more than one of the features discussed herein. Some examples of end cap 34 can be configured as a bearing support and not a commutator housing, as a bearing support but with a closed end of inner collar 50, as a commutator housing and not a bearing housing, etc. It is understood that end caps 34 having only one, more than one, all, or less than all of the features discussed are contemplated as being within the scope of the disclosure.

Cap cavity 72 includes bearing cavity 76 in the example shown. It is understood, however, that not all examples of end cap 34 are configured with bearing cavity 76 that receives bearing 28. Bearing 28 is disposed within bearing cavity 76. In the example shown, cap body 42 includes bearing collar 64 that defines bearing cavity 76. Bearing collar 64 forms a portion of inner collar 50. Support surface 70 defines the radial exterior of bearing cavity 76.

Shoulder 60 is formed at an axial end of bearing cavity 76 in first axial direction AD1. Shoulder 60 is disposed at a closed end of bearing cavity 76. Bearing 28 can be inserted into bearing cavity 76 through the open end of bearing cavity 76 that is oriented in second axial direction AD2 and that is formed at the interface of cavity wall 68 and support surface 70. Bearing 28 can interface within the notch formed between support surface 70 and shoulder 60 such that the bearing 28 is both axially and radially supported by cap body 42. Support surface 70 can, in some examples, directly interface with a surface of bearing 28, such as the outer race of bearing 28, to support bearing 28.

In the example shown, cap body 42 includes commutator collar 62 that defines commutator cavity 74. Commutator collar 62 and bearing collar 64 can be integrally formed. Commutator collar 62 and bearing collar 64 can be formed as a monolithic structure. Bearing collar 64 projects in first axial direction AD1 from commutator collar 62.

Commutator collar 62 forms a portion of inner collar 50. Cavity surface 66 defines a radial exterior of commutator cavity 74. Commutator collar 62 radially encompasses and can, in some examples, seal with the commutator 36. The commutator collar 62 has a lesser diameter than the outer collar 48. In the example shown, commutator collar 62 has a longer axial length than the outer collar 48.

In the example shown, cap cavity 72 includes commutator cavity 74. It is understood, however, that not all examples are so limited. Commutator cavity 74 is configured to house at least part of the commutator 36. Specifically, the interface between the tabs of the commutator 36 and the brushes 84 are disposed within commutator cavity 74. In some examples, the commutator cavity 74 can be tubular by existing radially inward of the motor housing and outward the commutator 36 and axially between the outer seal 78 and dust seal 80.

In the example shown, end cap 34 supports outer seal 78 and dust seal 80. It is understood, however, that some examples of end cap 34 include only one of outer seal 78 and dust seal 80. In some examples, end cap 34 does not include either outer seal 78 or dust seal 80. In some examples, one or both of outer seal 78 and dust seal 80 can be formed integrally with cap body 42. In some examples, one or both of outer seal 78 and dust seal 80 can be formed monolithically with cap body 42. In some examples, one or both of outer seal 78 and dust seal 80 can be formed separately from cap body 42 and connected to cap body 42. In the example shown, outer seal 78 is formed separately from and assembled to cap body 42, such as by adhesive, and dust seal 80 is formed monolithically with cap body 42.

Outer seal 78 is formed as a ring located at least partially around the commutator 36. In some examples, outer seal 78 extends fully annularly around commutator 36. Outer seal

78 projects radially inward towards axis AA from cavity surface 66. Outer seal 78 is disposed to radially overlap with commutator 36. A radially inner face of outer seal 78 is closer to commutator 36 than the radially inner face of cavity surface 66. Outer seal 78 may not contact the commutator 36 but can have a close tolerance to fit around the commutator 36 to create a narrow and elongate air gap between the commutator 36 and the end cap 34. Outer seal 78 can extend radially inward relative to a central bore extending axially through the end cap 34. As such, the interface of the outer seal 78 can be closer to the commutator 36 than the rest of the end cap 34. Outer seal 78 can be monolithically formed with cap body 42 or can be assembled to cap body 42. For example, outer seal 78 can be fixed to cap body 42 by adhesive, among other options.

Dust seal 80 extends axially into commutator cavity 74. Dust seal 80 projects axially towards commutator 36. Dust seal 80 extends from cavity wall 68 in the example shown. Dust seal 80 can be formed as a ring, partial, broken, or full, that extends about the axis AA. Dust seal 80 can be considered to form a lip.

Dust seal 80 can extend axially along the drive shaft 24 from the end cap 34 to interface with the commutator 36. In particular, the commutator 36 can have an annular recess that accepts the dust seal 80. An air gap exists between the commutator 36 and the dust seal 80 to allow rotation of the commutator 36 relative to the dust seal 80 without commutator 36 contacting end cap 34. The gap can be tortuous by the dust seal 80 extending into the recess on the commutator 36. Such a pathway means that any environmental contaminants would have to make several right-hand turns to escape from within the commutator cavity 74 to the outer side 44 of the end cap 34. Such a pathway further means that brush dust generated by the commutator assembly 26 would have to make several right-hand turns to move from commutator cavity 74 to bearing 28.

It is understood that outer seal 78 and dust seal 80 are not necessarily configured as hermetic seals. Instead, outer seal 78 and dust seal 80 form particularly narrow passages that inhibit passage along surfaces undergoing relative rotation. The passage can be straight or may include bends. Air can still pass by the outer seal 78 and dust seal 80 and, in some examples, brush dust can pass by the outer seal 78 and/or dust seal 80.

Commutator cavity 74 can be separated from bearing cavity 76 by dust seal 80. Bearing cavity 76 can have a smaller diameter than the commutator cavity 74. The dust generated by the interface of the brushes 84 and the commutator 36 can collect in the commutator cavity 74. Further, dust can collect in the bearing cavity 76. Accumulated dust can provide electrical short paths, such as from the brushes 84 and/or the commutator 36 to the drive shaft 24 and/or bearing 28, which can cause failure of the motor 20. Aspects of the present disclosure provide dust passages 54 for migration of the dust generated by brushes 84 and commutator 36 out of cap cavity 72.

Dust passages 54 are formed in end cap 34. Dust passages 54 extends from outer side 44 of end cap 34 to cap cavity 72 to allow brush dust to escape from within motor 20. In the example shown, dust passages 54 include openings formed on the interior of end cap 34 and openings formed on outer side 44. In the example shown, the openings on the interior of end cap 34 are formed through cavity wall 68, though it is understood that not all examples are so limited. The openings on the interior can also be referred to as inlet openings as such openings are configured to receive the brush dust from cap cavity 72. The openings on the outer side 44 can also be referred to as outlet openings as such openings are configured to output the brush dust from end cap 34.

Dust passages 54 extend between cap cavity 72 and the exterior of end cap 34 to allow brush dust to migrate from the interior of motor 20 to the exterior of motor 20. In the example shown, dust passages 54 extend from the commutator cavity 74 to the exterior of end cap 34 to allow brush dust to escape from inside of the motor 20. Dust passages 54 extend from within the end cap 34 to outside of the end cap 34. Dust passages 54 extend from the commutator cavity 74 to the outer side 44 of the end cap 34, in the example shown. Dust passages 54 provide flowpaths for the brush dust to migrate out from the interior of motor housing 22.

As shown, the dust passages 54 are disposed radially outward of the dust seal 80. Dust passages 54 include an opening on cavity wall 68 from which dust seal 80 projects. In the example shown, dust passages 54 are disposed radially between dust seal 80 and cavity surface 66. In the example shown, dust passages 54 are disposed adjacent to dust seal 80.

Dust passages 54 are disposed radially outward of bearing 28. Dust passages 54 extend axially from one axial side of the bearing 28 to the other axial side of the bearing 28 such that the dust passages 54 extend axially beyond bearing 28 in both axial directions AD1 and AD2. Dust passages 54 are disposed radially outward of bearing cavity 76. Dust passages 54 are positioned to help dust escape from the commutator cavity 74 to avoid the dust flowing to and collecting in the bearing cavity 76. Dust passages 54 define flowpaths that bypass the bearing cavity 76 to route the brush dust out of motor 20 without the brush dust flowing to or interfacing with the bearing 28. Dust passages 54 flow the brush dust around the bearing 28 and bearing cavity 76. Dust passages 54 are positioned such that at least a portion of the dust passage 54 radially overlaps with the bearing 28, in the example shown. Dust passages 54 are positioned such that at least a portion of the dust passage 54 radially overlaps with the bearing cavity 76, in the example shown. In the example shown, dust passages 54 have a greater length than bearing 28. Bearing 28 has an axial length BL. In the example shown, dust passages 54 have a greater length than bearing cavity 76. In the example shown, the openings of dust passages 54 on cavity wall 68 are spaced in second axial direction AD2 from bearing 28 and the openings of dust passages 54 on outer side 44 are spaced in first axial direction AD1 from bearing 28.

Dust passages 54 can be configured to receive the brush dust at a location spaced axially from bearing 28 such that the dust does not have an opportunity to freely flow to bearing 28 prior to reaching dust passages 54. Further, dust passages 54 are disposed between the interface between brushes 84 and commutator 36, where the brush dust is generated, and the dust seal 80. The dust seal 80 is meant to inhibit the brush dust from flowing to bearing cavity 76. However, in the absence of dust passages 54, brush dust may still flow into bearing cavity 76 as dust seal 80 does not create a contact seal with commutator 36, leading to potential shorting of motor 20. The dust passages 54 provide open flowpaths that allow the brush dust to flow out of the interior of motor 20. Dust passages 54 can be configured to output the brush dust at a location spaced axially from bearing 28 such that the brush dust does not fall to bearing 28.

In the example shown, end cap 34 includes multiple dust passages 54. It is understood that while a plurality of dust passages 54 are shown, end cap 34 can be configured with a single dust passage 54, two dust passages 54, three dust passages 54, four dust passages 54, five dust passages 54, six dust passage 54, or any desired number of dust passages 54.

As shown, dust passages 54 each extend axially parallel to the axis AA. In this embodiment, the dust passages 54 do not extend radially but instead extend only axially. It is understood, however, that dust passages 54 can extend radially between cap cavity 72 and outer side 44 and/or can extend axially and radially between inner side 46 and outer side 44. For example, dust passages 54 can be canted such that the opening on outer side 44 is spaced radially and axially from the opening on the interior of end cap 34. In some examples, dust passages 54 are not straight between the opening on the interior of end cap 34 and the opening on outer side 44. For example, dust passages 54 can bend or include a curve between the two openings. The ends of the dust passages 54 can be exposed on the exterior of the motor 20.

End cap 34 including dust passages 54 provides significant advantages. Dust passage 54 provide flowpaths for dust generated by conductive brushes 84 to flow from the interior of motor 20 to the exterior of motor 20. The dust passages 54 bypass bearing 28 such that the brush dust does not have to flow to or encounter bearing 28 for the brush dust to exit from the interior of motor 20. Dust passages 54 route the brush dust around bearing 28 and prevent dust from accumulating within the interior of motor 20. Dust passage 54 are disposed radially outward of bearing 28. Dust passages 54 are disposed radially between the location where the brush dust is generated (i.e., the interface between brushes 84 and commutator 36) and the bearing 28. Dust passages 54 are positioned such that the brush dust encounters dust passages 54 before the brush dust would have an opportunity to encounter bearing 28. Being that the dust is generated from a current conducting component, the brush dust itself can be current conducting and can cause an electrical short in some circumstances, resulting in failure of the electric motor. Dust passages 54 route the brush dust to the exterior of motor 20, preventing shorting and providing a longer operational life for motor 20 while also reducing costs.

Figure 3:
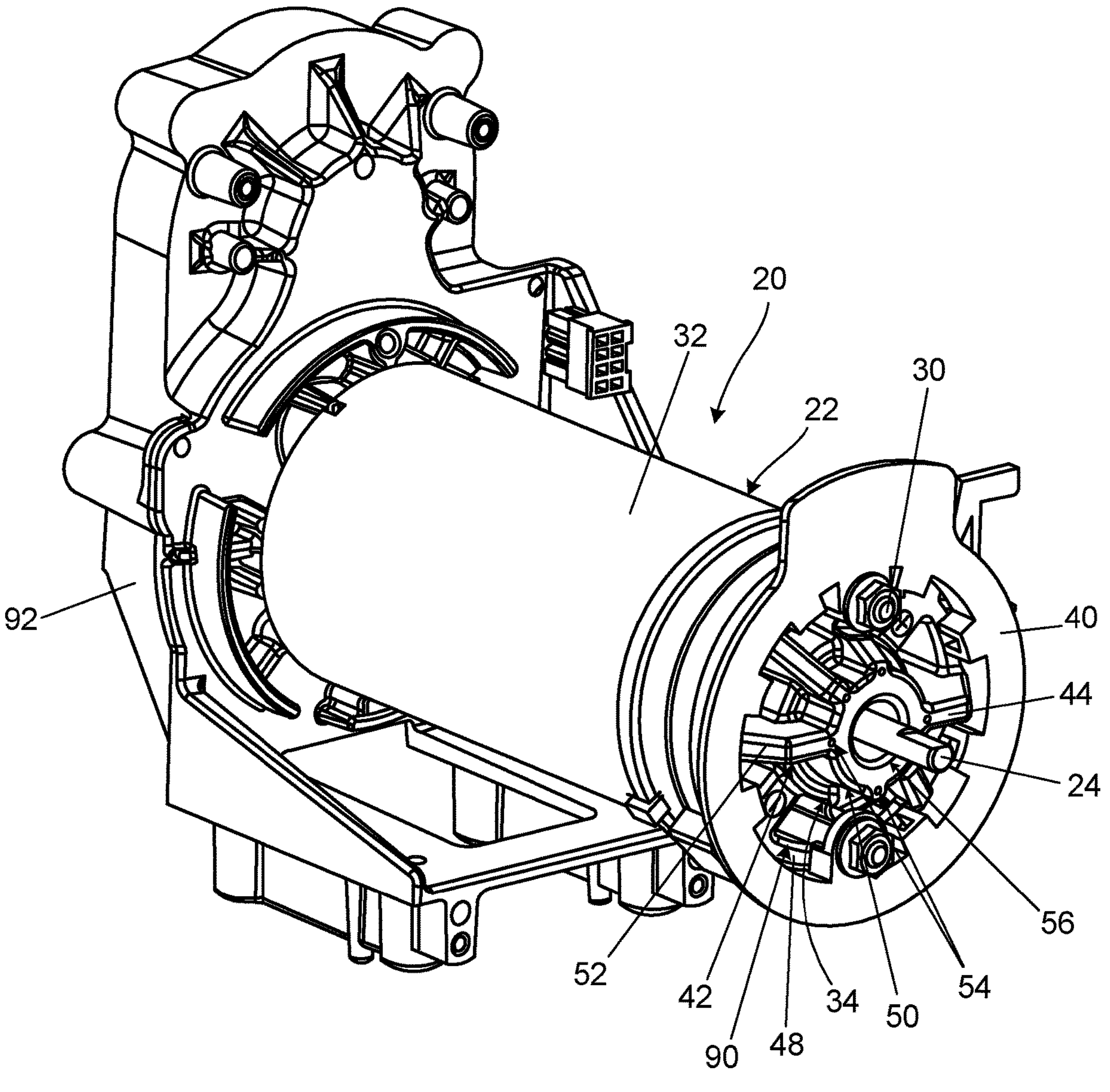
FIG. 3 is an isometric end view of a motor assembly for a pump.

FIG. 3 is an isometric view of motor 20. Motor housing 22 of motor 20 is shown. Wall unit 32 and end cap 34 of motor housing 22 are shown.

Outer collar 48 and inner collar 50 of cap body 42 are shown. Fasteners 30, such as bolts, extend through end cap 34 and axially within wall unit 32 to connect with motor support 92. Fasteners 30 can be considered to clamp the wall unit 32 between the motor support 92 and end cap 34. As shown, fasteners 30 can secure motor 20 to mounting bracket 40. The fasteners 30 can extend through fastener openings formed in outer collar 48 of end cap 34. Outer collar 48 can be considered to form a structural ring of end cap 34. Fasteners 30 facilitate connection of motor 20 to motor support 92. Motor support 92 can form a component of frame 16.

Inner collar 50 is disposed radially inward of outer collar 48. In the example shown, drive shaft 24 projects axially out of end cap 34. Specifically, drive shaft 24 extends through inner collar 50 and projects out of outer aperture 56 formed in inner collar 50. Outer aperture 56 is formed on outer side 44 of end cap 34.

Ribs 52 extend between and connect inner collar 50 and outer collar 48. Ribs 52 can structurally connect the inner collar 50 and the outer collar 48. In the example shown, voids 90 are formed circumferentially between the ribs 52. The voids 90 are formed radially between inner collar 50 and outer collar 48. Voids 90 can provide airflow passages for cooling of motor 20. In some examples, air flow is generated within motor 20, such as due to convective flow, and the air flows out of the motor 20 through end cap 34, such as through voids 90. Such airflow can also assist in driving brush dust to and through dust passages 54.

Dust passages 54 extend through cap body 42. In the example shown, the exterior openings of dust passages 54 are shown. Dust passages 54 extend through cap body 42 and provide flowpaths for brush dust to exit from the interior of motor 20 and flow to the exterior of motor 20. More specifically, dust passages 54 provide flowpaths for brush dust to flow from a cavity within inner collar 50 to the exterior of motor 20.

Figure 4A:
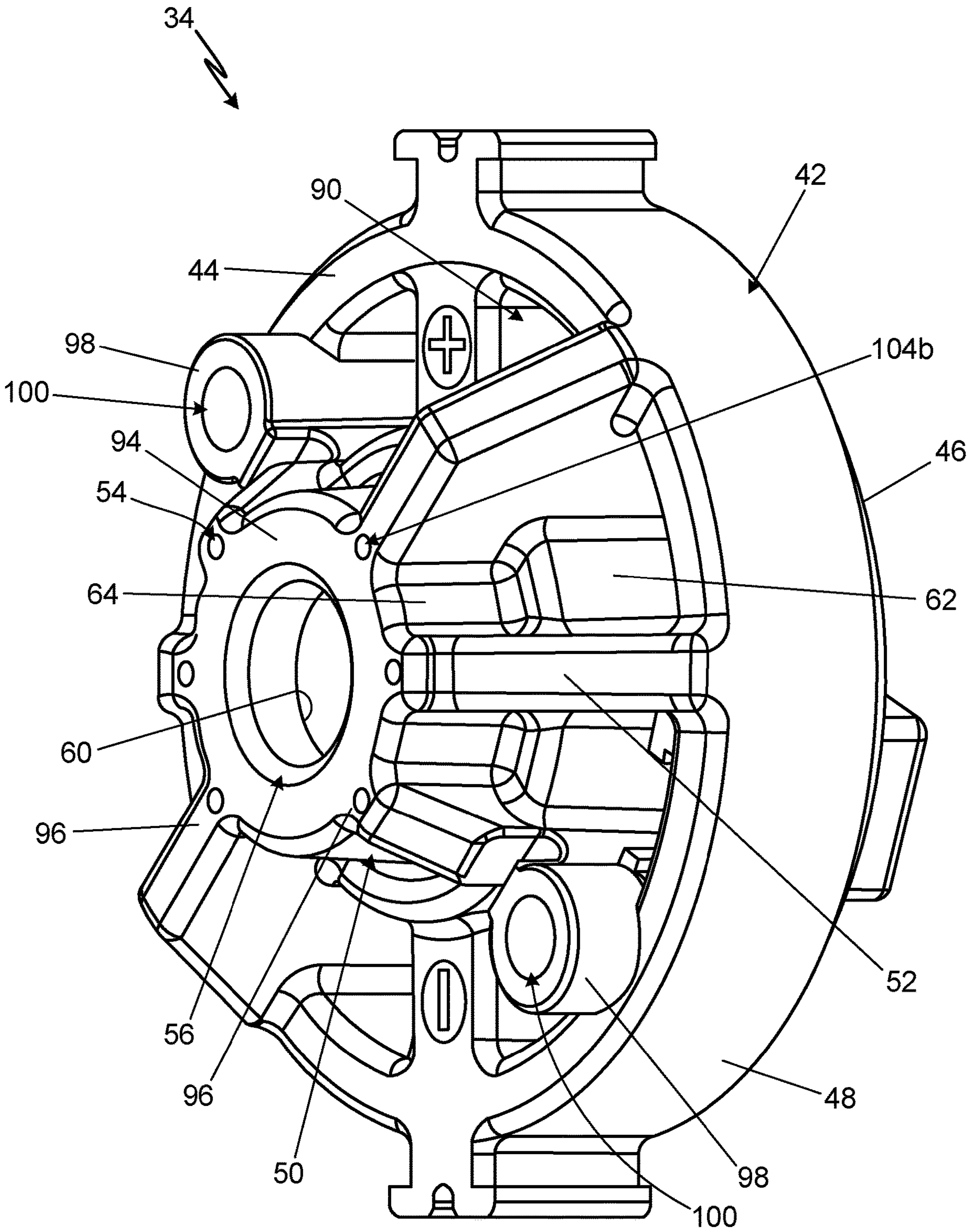
FIG. 4A is a first isometric view of a motor cap for a motor assembly.
Figure 4B:
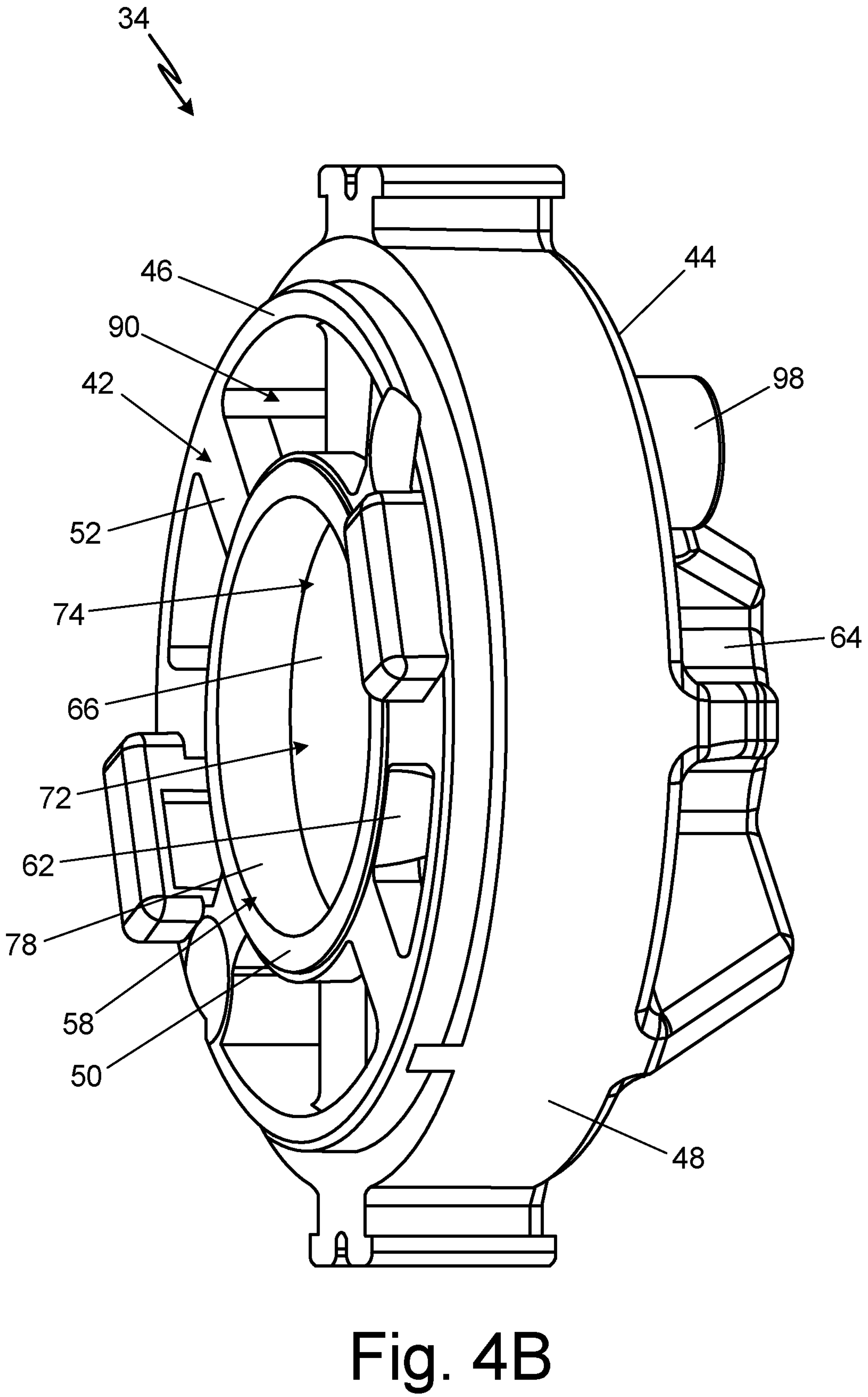
FIG. 4B is a second isometric view of the motor cap shown in FIG. 4A.
Figure 4C:
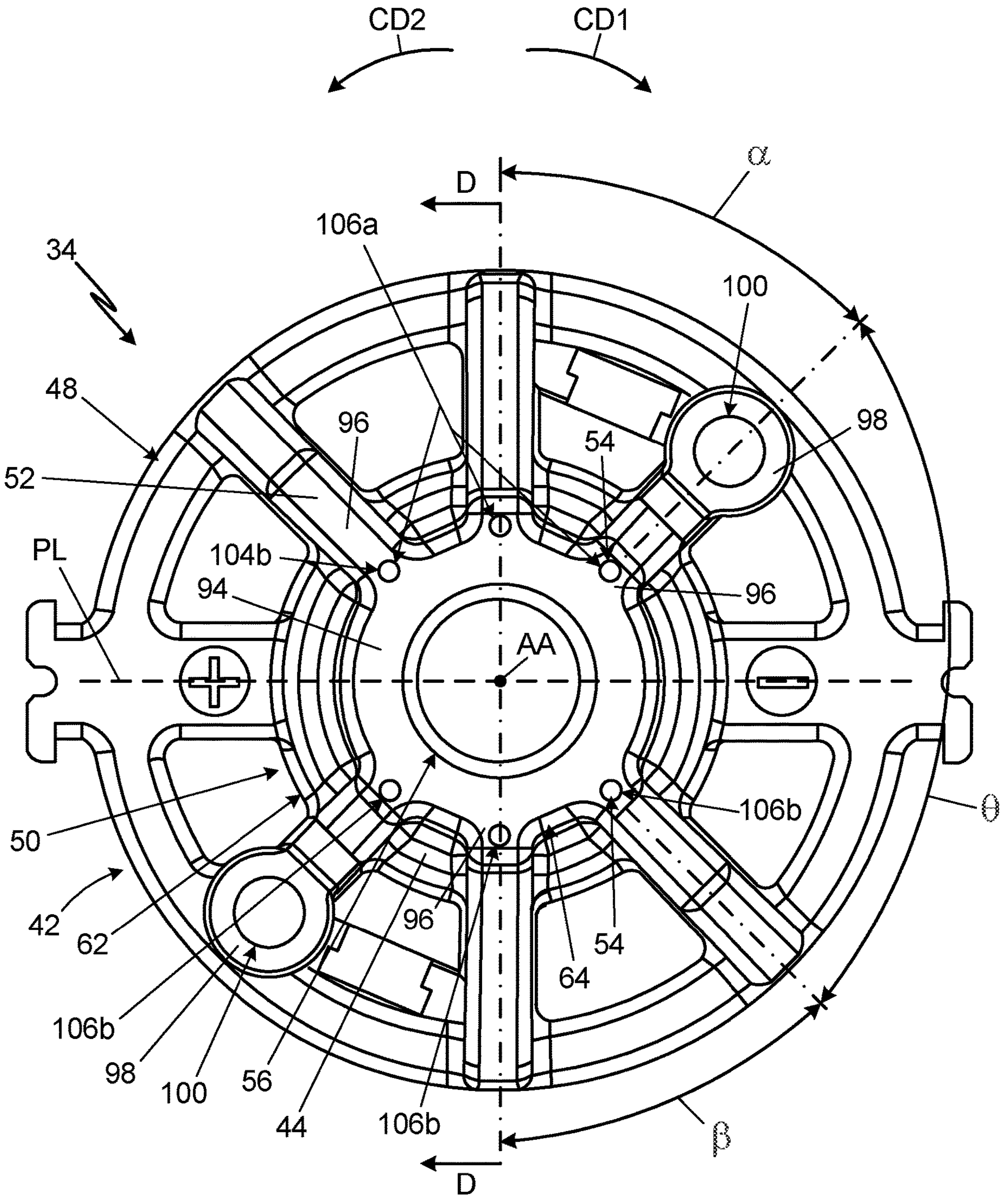
FIG. 4C is an elevational end view of an exterior side of the motor cap shown in FIG. 4A.
Figure 4D:
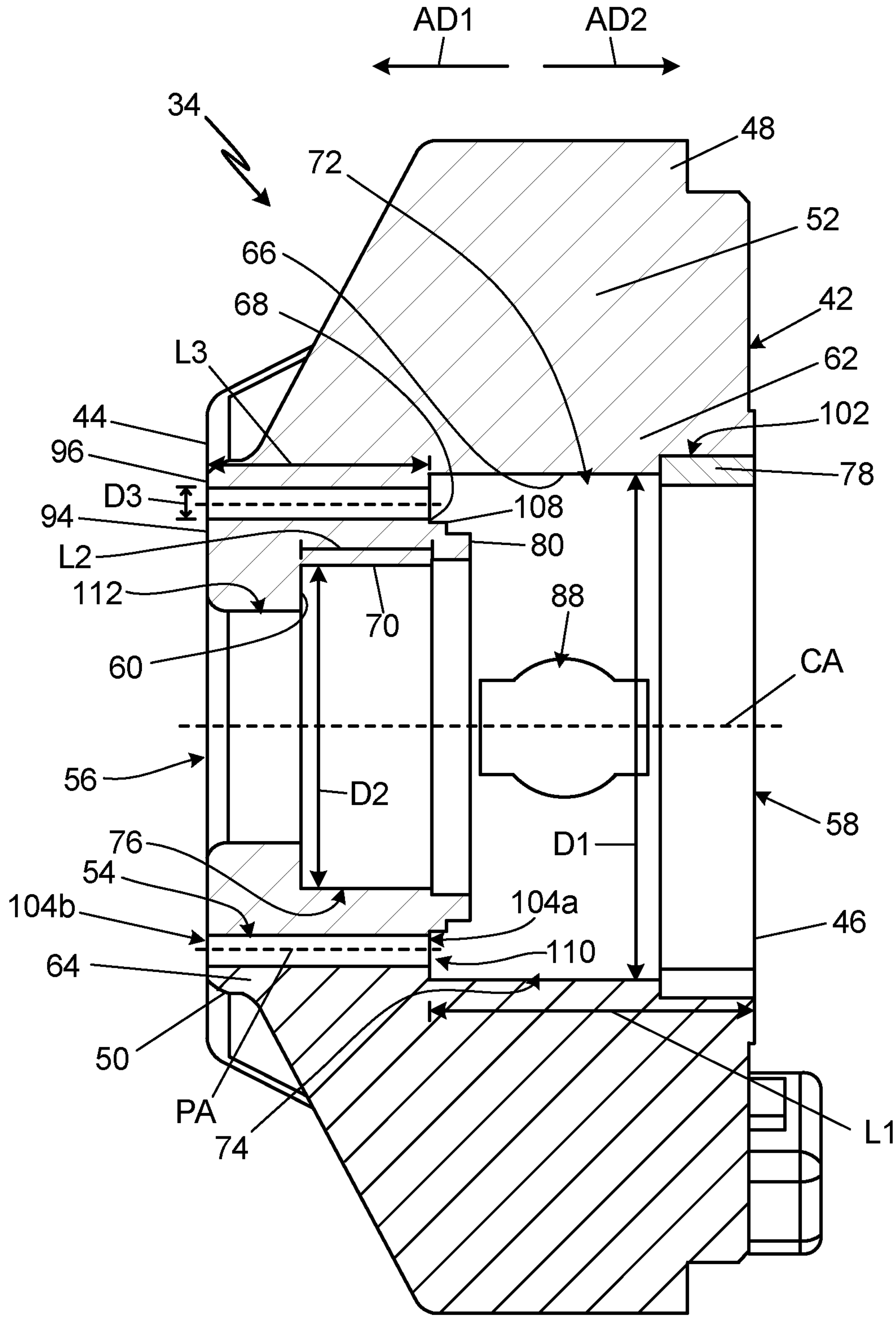
FIG. 4D is a cross-sectional view taken along line D-D in FIG. 4C.

FIG. 4A is a first isometric view of end cap 34. FIG. 4B is a second isometric view of end cap 34. FIG. 4C is an elevational end view of end cap 34. FIG. 4D is a cross-sectional view of end cap 34 taken along line D-D in FIG. 4C. FIGS. 4A-4D will be discussed together. Cap body 42 of end cap 34 includes outer collar 48, inner collar 50, ribs 52, inner side 46, and outer side 44. Inner collar 50 includes commutator collar 62 and bearing collar 64. Inner collar 50 defines cap cavity 72. Cavity surface 66, cavity wall 68, support surface 70, and shoulder 60 are formed on an interior of end cap 34.

End cap 34 is configured to at least partially enclose components of a DC brushed motor within a motor housing of the motor (e.g., enclose components of motor 20 within motor housing 22). For example, end cap 34 can form a portion of the motor housing 22. In some examples, end cap 34 can at least partially surround various of the components of the motor. In some examples, end cap 34 can structurally support one or more of the components of the motor, such as bearing 28 (FIGS. 1B and 2B).

Outer collar 48 is forms a radially outer portion of cap body 42. Outer collar 48 can be a structural ring configured to interface with a main body portion of motor 20, such as wall unit 32 (best seen in FIG. 3).

Inner collar 50 is disposed radially inward of outer collar 48. In the example shown, inner collar 50 radially overlaps with outer collar 48. Inner collar 50 includes end face 94 that forms a portion of outer side 44 of cap body 42. End face 94 is oriented in first axial direction AD1. End face 94 can be configured as a planar surface, among other options. End face 94 can be disposed on a plane normal to the cap axis CA.

Inner collar 50 includes bearing collar 64 and commutator collar 62 in the example shown. Bearing collar 64 extends axially from commutator collar 62. Bearing collar 64 extends in first axial direction AD1 from commutator collar 62. Bearing collar 64 has a smaller outer diameter than commutator collar 62. In the example shown, a diameter of cap cavity 72 is smaller within bearing collar 64 than within commutator collar 62.

Ribs 52 extend between and connect outer collar 48 and inner collar 50. Ribs 52 structurally connect inner collar 50 to outer collar 48. Ribs 52 extend radially inward between outer collar 48 and inner collar 50. In the example shown, ribs 52 extend between outer collar 48 and connect to both commutator collar 62 and bearing collar 64. In the example shown, at least some of ribs 52 project axially relative to outer collar 48. At least some of ribs 52 project axially relative to commutator collar 62. The ribs 52 extend in first axial direction AD1 from outer collar 48 and commutator collar 62. In the example shown, ribs 52 include rib faces 96 that are oriented in first axial direction AD1. Rib faces 96 can be configured as planar surfaces, among other options. Each of the rib faces 96 can be disposed on the same plane.

Each of the rib faces 96 can be disposed on a plane normal to the cap axis CA. In the example shown, rib faces 96 are co-planar with end face 94.

In the example shown, a first subset of the ribs 52 have rib faces 96 having a first radial length and a second subset of the ribs 52 have rib faces 96 having a second radial length different from the first radial length. More specifically, the example shown includes two ribs 52 having rib faces 96 of the first radial length and four ribs 52 having rib faces 96 of the second radial length, the second radial length being less than the first radial length. The ribs 52 that have rib faces 96 of the same radial length can be disposed opposite each other about the cap axis CA. The ribs 52 that have rib faces 96 of the same radial length can be disposed 180-degrees from each other about the cap axis CA. Cap axis CA extends along a midline through the end cap 34 in the example shown.

Voids 90 are formed circumferentially between ribs 52. Voids 90 extend fully axially through cap body 42 in the example shown. Voids 90 provide flowpaths for air to flow axially through cap body 42. For example, cooling air can flow through voids 90. It is understood that not all examples of end cap 34 includes ribs 52 and voids 90. In some examples, end cap 34 does not include voids 90 radially between inner collar 50 and outer collar 48. In such an example, the space radially between inner collar 50 and outer collar 48 can be fully occupied by structure.

Bosses 98 extend in first axial direction AD1 relative to outer collar 48. Bosses 98 are formed partially on outer collar 48 and partially in the space radially between outer collar 48 and inner collar 50. In the example shown, a rib 52 connects with outer collar 48 at each boss 98. Bosses 98 define fastener openings 100 that extend fully axially through cap body 42. Fasteners 30 (FIGS. 1B, 2B, 3) extend through fastener openings 100 to secure end cap 34.

Cap body 42 defines cap cavity 72. More specifically, cap cavity 72 is formed within inner collar 50. Cap cavity 72 is disposed within both commutator collar 62 and bearing collar 64 in the example shown.

Cap cavity 72 includes commutator cavity 74 in the example shown. Commutator cavity 74 is disposed radially within commutator collar 62. Commutator cavity 74 is configured such that commutator 36 (FIGS. 1B and 2B) is at least partially disposed within commutator cavity 74 with motor 20 assembled together. Commutator cavity 74 has an axial length L1. Commutator cavity 74 has a diameter D1.

Brush cavities 88 extend through cap body 42. Brush cavities 88 extend radially through inner collar 50 and outer collar 48. Brush cavities 88 radially overlap with commutator cavity 74. Brush cavities 88 are configured to at least partially receive conductive brushes 84 (FIG. 2B). The conductive brushes 84 project into commutator cavity 74 to contact commutator 36. The commutator 36 is configured to rotate relative to the conductive brushes 84 during operation. Such relative rotation wears the conductive brushes 84 and generates brush dust in cap cavity 72.

Cap cavity 72 includes bearing cavity 76 in the example shown. Cap cavity 72 is disposed radially within bearing collar 64. Bearing cavity 76 is configured such that bearing 28 is at least partially disposed within bearing cavity 76 with bearing 28 mounted to end cap 34. Bearing cavity 76 has an axial length L2. Bearing cavity 76 has a diameter D2.

Outer aperture 56 is formed on outer side 44 of the end cap 34. In the example shown, shaft passage 112 extends axially between outer side 44 and cap cavity 72. More specifically, shaft passage 112 extends axially between outer side 44 and bearing cavity 76. Outer aperture 56 provides an opening for the drive shaft 24 to extend from the interior of cap body 42 to an exterior of cap body 42. The shaft passage 112 is defined in part by the shoulder 60. While end cap 34 is shown as including outer aperture 56, it is understood that not all examples are so limited. For example, end face 94 can be fully or partially closed such that drive shaft 24 cannot pass through cap body 42 from the interior to the exterior of cap body 42. As such, while shaft passage 112 is shown as open in both first axial direction AD1 and second axial direction AD2

Inner aperture 58 is disposed at an opposite axial side of cap cavity 72 from outer aperture 56. Inner aperture 58 provides an opening for components to enter into cap cavity 72. For example, commutator 36 can extend through inner aperture 58 to be partially disposed within commutator cavity 74. Inner aperture 58 is formed through inner side 46 of cap body 42.

Cavity surface 66, cavity wall 68, support surface 70, and shoulder 60 are formed in an interior of cap body 42. More specifically, cavity surface 66, cavity wall 68, support surface 70, and shoulder 60 form surfaces defining cap cavity 72. Cavity surface 66 extends axially within cap body 42. Cavity surface 66 defines a radial surface of commutator cavity 74. Cavity surface 66 can be formed as an annular surface disposed around cap axis CA. In examples in which commutator 36 is disposed at least partially in cap cavity 72, the commutator 36 is spaced radially from and not in contact with cavity surface 66. Cavity surface 66 extends axially between inner aperture 58 and cavity wall 68. In the example shown, seal support 102 is formed as a radial enlargement in cavity surface 66. Seal support 102 is configured to receive outer seal 78 (FIGS. 1B and 2B) in the example shown. It is understood, however, that in some examples, cavity surface 66 may not include seal support 102 and may instead extend only axially between inner aperture 58 and cavity wall 68. In some examples, outer seal 78 is integrally formed with and monolithic with cap body 42.

Cavity wall 68 is disposed at an opposite axial end of cavity surface 66 from inner aperture 58. Cavity wall 68 is disposed at an opposite axial end of commutator cavity 74 from inner aperture 58. Cavity wall 68 extends radially inward from cavity surface 66. In the example shown, cavity wall 68 extends radially between cavity surface 66 and bearing cavity 76. More specifically, cavity wall 68 extends radially between cavity surface 66 and support surface 70.

Dust seal 80 projects axially into commutator cavity 74. Dust seal 80 is configured to project axially towards commutator 36. Dust seal 80 extends from cavity wall 68 in the example shown. Dust seal 80 projects axially in second axial direction AD2 from cavity wall 68. Dust seal 80 can be formed as a ring, partial, broken, or full, that extends about the cap axis CA. Dust seal 80 can be considered to form a lip that is disposed radially between dust passages 54 and bearing cavity 76.

In the example shown, cavity wall 68 includes step 108 that is disposed between dust passage 54 and dust seal 80. Step 108 extends axially from cavity wall 68 and then radially to dust seal 80. Step 108 can extend fully annularly about cap axis CA. Step 108 is disposed radially outward of dust seal 80. Step 108 is disposed radially between dust seal 80 and dust passages 54.

Channel 110 is formed radially between step 108 and cavity surface 66. Channel 110 can extend fully annularly around cap axis CA. Channel 110 provides a flow path for brush dust to flow circumferentially within cap cavity 72 such that the brush dust can flow to any one of dust passages 54. In the example shown, each of openings 104*a* of dust passages 54 open into channel 110.

In the example shown, end cap 34 includes an array of dust passages 54 disposed around the cap axis CA. The example shown includes six dust passages 54 arrayed around outer aperture 56. It is understood, however, that not examples are so limited. End cap 34 can include one dust passage 54, two dust passages 54, three dust passages 54, or more dust passages 54 up to any desired number of dust passages 54.

Dust passages 54 extend through cap body 42. Dust passages 54 extend between outer side 44 and cap cavity 72. As best seen in FIG. 4D, each dust passage 54 extends between opening 104*a* on inner side 46 that is open to cap cavity 72 and opening 104*b* on outer side 44. Opening 104*a* can also be referred to as a passage inlet as dust passages 54 are configured to receive brush dust into the dust passage 54 through opening 104*a*. Opening 104*b* can also be referred to as a passage outlet as dust passages 54 are configured to emit brush dust from the dust passage 54 through opening 104*b*. Dust passages 54 have diameter D3. Dust passages 54 have length L3.

Openings 104*a* of the dust passages 54 are formed through cavity wall 68. Openings 104*a* are apertures that are configured to allow brush dust to enter into dust passages 54. Openings 104*a* are disposed radially between support surface 70 and cavity surface 66. Openings 104*a* are disposed radially outward of bearing cavity 76. In the example shown, openings 104*a* are axially aligned with commutator cavity 74 and open into commutator cavity 74. In the example shown, opening 104*a* are recessed relative to the dust seal 80. The openings 104*a* are spaced in first axial direction AD1 from the distal end of the dust seal 80 that is oriented in second axial direction AD2. Openings 104*a* can be considered to be recessed beyond the lip forming the dust seal 80 in the example shown. It is understood, however, that not all examples are so limited. For example, dust passages 54 can be formed such that openings 104*a* extend to be flush with the distal end of dust seal 80 or formed partially on the dust seal 80. In some examples, end cap 34 may not include a dust seal 80. It is further understood that not all openings 104*a* need to be in the same plane normal to the cap axis CA. For example, some of openings 104*a* may be recessed from the end of dust seal 80, some of openings 104*a* may be flush with dust seal 80, some of openings 104*a* may be spaced in second axial direction AD2 from dust seal 80, or any combination thereof.

In the example shown, openings 104*a* are disposed radially between dust seal 80 and cavity surface 66. Positioning openings 104*a* radially outward of dust seal 80 protects bearing 28 from dust intrusion. Dust seal 80 inhibits brush dust from migrating radially inward from the brush-commutator interface to the bearing cavity 76. Openings 104*a* are disposed such that the brush dust can flow to and through openings 104*a* without having to flow past a seal, such as dust seal 80.

Each dust passage 54 extends axially along a passage axis PA between openings 104*a*, 104*b* in the example shown. Dust passages 54 are cylindrical in the example shown. Dust passages 54 do not include corners or curves between openings 104*a*, 104*b* in the example shown. Dust passages 54 extending axially without corners facilitates dust flow through dust passages 54. Corners can provide surfaces that brush dust can accumulate on. Dust passages 54 not including corners inhibits dust accumulation within dust passages 54, thereby preventing clogging of the dust passages 54. While dust passages 54 are shown as extending straight between openings 104*a*, 104*b*, it is understood that not all examples are so limited.

In the example shown, the passage axis PA is parallel to the cap axis CA through end cap 34. The passage axis PA can be parallel to the axis AA. It is understood, however, that not all examples are so limited. For example, the passage axis PA of one or more of the dust passages 54 can be disposed transverse to the cap axis CA. In such an example, dust passages 54 can be configured to extend such that opening 104*a* is disposed one of radially inward and radially outward of opening 104*b*. In some such examples, openings 104*a*, 104*b* are spaced axially relative to each other, though it is understood that not all examples are so limited. For example, dust passages 54 can extend radially such that openings 104*a*, 104*b* are radially but not axially spaced relative to each other. In some examples, canted dust passages 54 that extend axially and radially can extend through the ribs 52 such that each opening 104*b* is formed fully on a respective rib 52. For example, the opening 104*b* can be disposed on the sloped surface of the rib 52 that extends both axially and radially between the outer collar 48 and the inner collar 50.

Openings 104*b* of the dust passages 54 are radially aligned with the ribs 52, such that each opening 104*b* radially overlaps with a rib 52. Openings 104*b* are oriented in second axial direction AD2. In the example shown, openings 104*b* are formed in the axial-most face of cap body 42. Openings 104*b* can be formed partially or fully on end face 94 of inner collar 50. Openings 104*b* can be formed partially or fully on rib faces 96 of ribs 52. In the example shown, each opening 104*b* of a dust passage 54 partially overlaps with the inner collar 50 and partially overlaps with a respective rib 52. Having the openings 104*b* partially on inner collar 50 and partially on ribs 52 provides space for the openings 104*b* of the dust passages 54 without structurally compromising either the inner collar 50 or the ribs 52. In various other embodiments, each opening 104*b* of a dust passage 54 may be wholly on a rib 52 or, alternatively, wholly on the inner collar 50.

Dust passages 54 have diameter D3. Diameter D3 is smaller than diameter D1 of commutator cavity 74. Diameter D3 is smaller than diameter D2 of bearing cavity 76. Diameter D3 is sized to allow dust migration out of cap cavity 72 and to the exterior of end cap 34. Diameter D3 is sized to inhibit environmental intrusion into the interior of motor 20. Dust passages 54 can thus define flowpaths that allow brush dust to migrate out of the interior of end cap 34 while also inhibiting environmental contaminants from migrating into the interior of end cap 34. Diameter D3 can be between about 0.03 inches (in.) (about 0.76 millimeters (mm)) and about 0.12 in. (about 3.05 mm). In some examples, diameter D3 can be between about 0.062 in. (about 1.57 mm) and about 0.093 in. (about 2.36 mm). In the example shown, diameter D3 is about 0.08 in. (about 2.03 mm).

Dust passages 54 have length L3. Length L3 is shorter than length L1 of commutator cavity 74 in the example shown. It is understood, however, that in some examples, length L3 can be equal to or greater than length L1. Length L3 is longer than length L2 of bearing cavity 76 in the example shown. It is understood, however, that in some examples, length L3 can be equal to or greater than length L2. Length L3 is sized to allow dust migration out of cap cavity 72 and to the exterior of end cap 34. Length L3 is sized to inhibit environmental intrusion into the interior of motor 20.

In the example shown, length L3 is greater than length L2 of bearing cavity 76 such that dust passages 54 extend axially beyond bearing cavity 76. In the example shown, dust passages 54 extend axially beyond bearing cavity 76 in first axial direction AD1. It is understood that, in some examples, the dust passages 54 can extend beyond bearing cavity 76 in both first axial direction AD1 and second axial direction AD2. As best seen in FIG. 1B, dust passages 54 extend in both axial directions AD1 and AD2 beyond the bearing 28 that is disposed within bearing cavity 76 in the examples shown.

Dust passages 54 extending axially beyond bearing cavity 76 in first axial direction AD1 positions openings 104*b* such that openings 104*b* are spaced axially in first axial direction AD1 from bearing cavity 76. Positioning openings 104*b* axially outward of bearing cavity 76 means that the dust passages 54 emit the brush dust at locations spaced axially from bearing 28. Emitting the brush dust at such a location inhibits dust from flowing back to bearing 28 as the brush dust would have to turn the corner to outer aperture 56 and then flow in second axial direction AD2 to bearing 28. The positions of openings 104*b* means that the brush dust cannot simply fall to the location of the bearing 28.

Dust passages 54 extend through the ribs 52 and/or inner collar 50 which lengthens the dust passages 54 as compared to if the dust passages 54 had openings 104*b* in the crevices between the ribs 52. As previously mentioned, longer dust passages 54 provide better mitigation of environmental intrusion into motor 20. In the example shown, and as best seen in FIG. 4C, dust passages 54 are disposed in passage subarrays 106*a*, 106*b*. Each subarray 106*a*, 106*b* is formed as an arcuate array of the dust passages 54 that is disposed partially around the cap axis CA. The subarrays 106*a*, 106*b* are disposed on opposite sides of a plane PL extending along the cap axis CA. The plane PL extends through brush cavities 88. Subarrays 106*a*, 106*b* are disposed on opposite radial sides of the brush cavities 88.

In the example shown, the dust passages 54 of subarray 106*a* are evenly spaced from each other about cap axis CA. It is understood, however, that not all examples are so limited. For example, the dust passages 54 of subarray 106*a* can be unequally spaced about the cap axis CA. The dust passages 54 of subarray 106*a* are circumferentially spaced from each other by angle α about cap axis CA. Dust passages 54 of subarray 106*a* can be considered to be spaced from each other by a circumferential gap. Angle α can be of any desired angle, such as 30-degrees, 45-degrees, 60-degreees, etc. In the example shown, angle α is about 45-degreees.

In the example shown, the dust passages 54 of subarray 106*b* are evenly spaced from each other about cap axis CA. It is understood, however, that not all examples are so limited. For example, the dust passages 54 of subarray 106*b* can be unequally spaced about the cap axis CA. The dust passages 54 of subarray 106*a* are circumferentially spaced from each other by angle β about cap axis CA. Dust passages 54 of subarray 106*b* can be considered to be spaced from each other by a circumferential gap. Angle β can be of any desired angle, such as 30-degrees, 45-degrees, 60-degrees, etc. In the example shown, angle β is about 45-degreees. Angle α can be the same as or different from angle β.

In the example shown, subarray 106*a* includes the same number of dust passages 54 as subarray 106*b*. Each subarray 106*a*, 106*b* includes half of the total number of dust passages 54 of end cap 34. It is understood, however, that not all examples are so limited. For example, one of subarrays 106*a*, 106*b* can include a different number of dust passages 54 than the other subarray 106*a*, 106*b*.

In the example shown, circumferentially outer dust passages 54 of subarray 106*a* are circumferentially spaced from circumferentially outer dust passages 54 of subarray 106*b* by angle θ about cap axis CA. Subarray 106*a* is spaced circumferentially from subarray 106*b* by angle θ. As such, subarray 106*a* can be considered to be spaced from subarray 106*b* by circumferential gaps. In the example shown, subarray 106*a* is spaced circumferentially from subarray 106*b* by angle θ in both first circumferential direction CD1 and in second circumferential direction CD2. It is understood, however, that not all examples are so limited. Angle θ can be of any desired angle for separating subarray 106*a* and subarray 106*b*. Angle θ can be any desired angle for separating subarray 106*a* and subarray 106*b*, such as 45-degrees, 60-degrees, 90-degrees, 120-degrees, etc. In the example shown, angle θ is about 90-degrees.

In the example shown, angle θ is larger than angle α. As such, subarray 106*a* is circumferentially spaced from subarray 106*b* by a greater extent that dust passages 54 of subarray 106*a* are spaced relative to each other. Angle θ can be about 1.5 times larger than angle α, can be two times larger than angle α, can be three times larger than angle α, among other options.

In the example shown, angle θ is larger than angle β. As such, subarray 106*b* is circumferentially spaced from subarray 106*a* by a greater extent that dust passages 54 of subarray 106*b* are spaced relative to each other. Angle θ can be about 1.5 times larger than angle β, can be two times larger than angle β, can be three times larger than angle β, among other options.

Passage subarrays 106*a*, 106*b* are disposed on opposite sides of plane PL that extends through brush cavities 88. In the example shown, passage subarrays 106*a*, 106*b* are symmetrical relative to the plane PL. Subarray 106*a* is disposed circumferentially between the two brush cavities 88 through end cap 34. Subarray 106*b* is disposed circumferentially between the two brush cavities 88 but on an opposite circumferential side of the brush cavities 88 from subarray 106*a*. In the example shown, no dust passage 54 is circumferentially aligned with a brush cavity 88. Instead, each dust passage 54 is circumferentially offset from the brush cavities 88, though it is understood that not all examples are so limited. In some examples, one or more of dust passages 54 can be axially aligned with brushes 84.

Arranging the dust passages 54 circumferentially offset from brush cavities 88 can assist in encouraging brush dust to flow to and through dust passages 54. The commutator 36 rotating relative to the brushes 84 generates the brush dust. Such rotation of commutator 36 can drive the brush dust circumferentially within cap cavity 72. Having the dust passages 54 circumferentially offset from brush cavities 88 positions dust passages 54 to receive the brush dust that is blown circumferentially within cap cavity 72 due to rotation of commutator 36.

End cap 34 including dust passages 54 provides significant advantages. Dust passages 54 provide flowpaths for brush dust to flow from cap cavity 72 to the exterior of end cap 34. Routing the brush dust out of the bearing cavity 76 through dust passages 54 prevents the brush dust from flowing to and accumulating on bearing 28, which charged dust accumulating on bearing 28 can create an electrical pathway through bearing 28 and drive shaft 24 to motor 20 and cause a short in motor 20. Migrating the brush dust out of cap cavity 72 through dust passages 54 prevents shorting of motor 20 due to dust accumulation, providing a longer operating life for motor 20, decreasing operating costs and downtime, and increasing user confidence in operation of motor 20.

Dust passages 54 exhausting the brush dust outside of the end cap 34 reduces the likelihood of brush dust accumulation between commutator bars of commutator 36, which can also lead to a motor failure due to shorting. Dust passages 54 inhibit environmental contaminants from migrating into motor 20, which substances can cause the brush dust to coagulate between the bars of the commutator 36.

Dust passages 54 are in flow communication with the commutator cavity 74 such that brush dust can flow to the dust passages 54 without having to first pass over a seal (e.g., outer seal 78 or dust seal 80). The brush dust is able to freely flow to the dust passages 54 to be ejected from the interior of end cap 34.

The dust passages 54 in the example shown are axially longer than bearing cavity 76 to route the brush dust around bearing cavity 76 and prevent migration of the brush dust to the bearing cavity 76. Dust passages 54 emit the brush dust at a location spaced axially from bearing cavity 76, inhibiting migration of the brush dust back to the bearing cavity 76.

Dust passages 54 are disposed radially outward of bearing cavity 76 such that the brush dust enters dust passages 54 at a location radially outward of bearing cavity 76. The dust passages 54 are disposed radially outward of dust seal 80 and radially inward of cavity surface 66. The brush dust is generated at the interface between brushes 84 and commutator 36, which interface is also disposed radially outward of dust seal 80 and radially inward of cavity surface 66. As such, dust passages 54 are disposed radially between the surfaces that the brush dust accumulates on (e.g., cavity surface 66 and dust seal 80) such that dust passages 54 are positioned to receive the brush dust. The interface between brushes 84 and commutator 36 is disposed radially outward of bearing cavity 76. Dust passages 54 being positioned radially outward of bearing cavity 76 facilitates migration of dust out of end cap 34 prior to the dust flowing to a location axially overlapping with bearing cavity 76.

Dust passages 54 are positioned to receive the brush dust at a location between the interface between brushes 84 and commutator 36 and the bearing cavity 76. The dust passages 54 receiving the brush dust at such a location means that the brush dust encounters openings 104*a* of dust passages 54 prior to having an opportunity to flow to the bearing cavity 76. Such positioning inhibits flow of the brush dust to locations that can cause electrical shorting of the motor 20.

Figure 5:
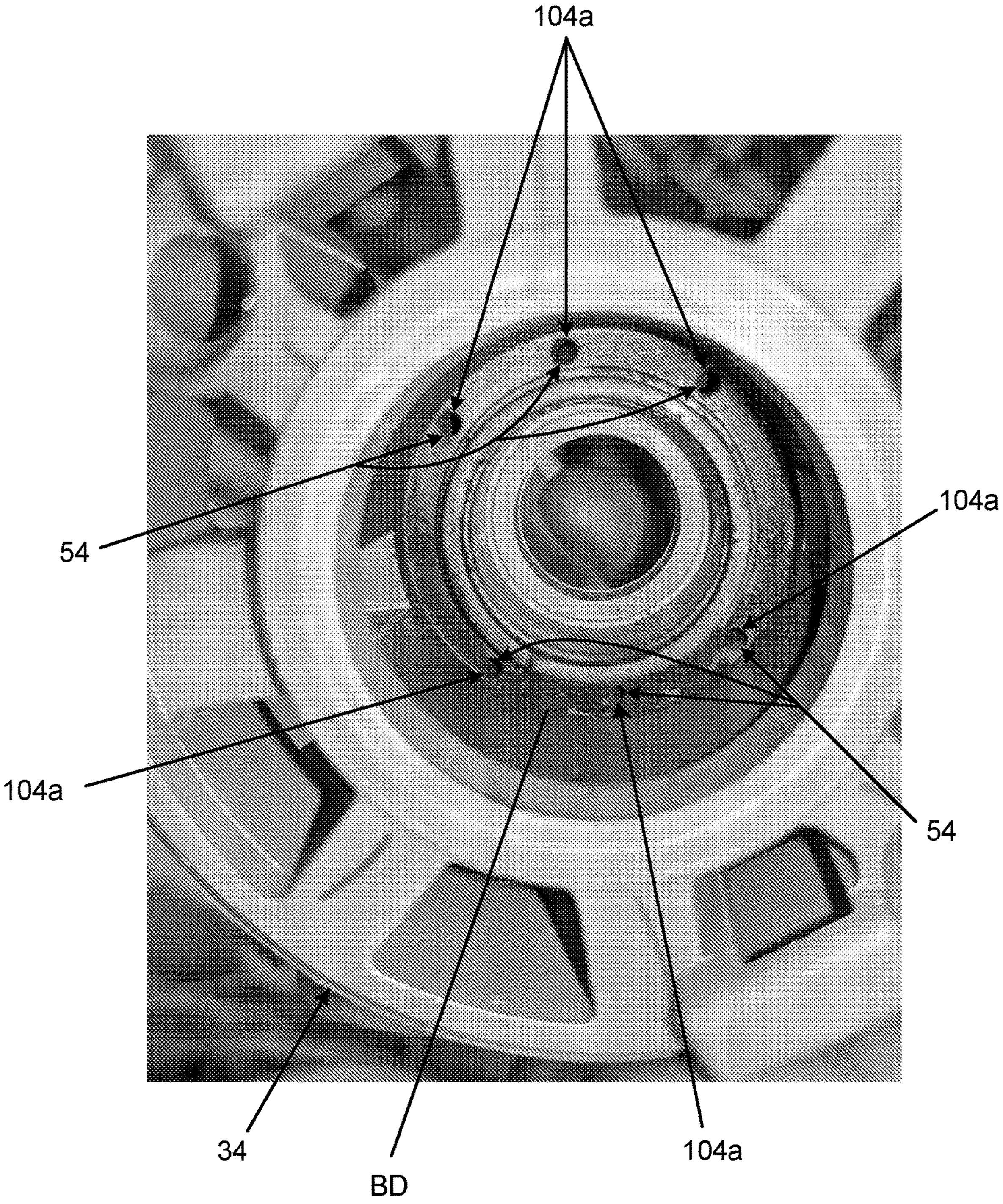
FIG. 5 is a photographic isometric end view of an interior side of the end cap shown in FIG. 4A showing brush dust accumulation.

FIG. 5 is a photographic end view of end cap 34 showing brush dust BD having accumulated near the openings 104*a* of the dust passages 54 in the cap cavity 72. Accumulation in this location shows that placements of the openings 104*a* of the dust passages 54 helps pass the brush dust through the dust passages 54 and out of the end cap 34, where the risk of electrical short is significantly less.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An end cap for a motor housing of an electric motor, the end cap comprising:

a cap body having an inner side and an outer side, the cap body disposed about a cap axis and at least partially defining a cap cavity on an interior of the cap body, the cap cavity including a commutator cavity configured to at least partially surround a commutator of the electric motor;

a dust passage extending between the cap cavity and the outer side, the dust passage configured to permit dust to migrate from the interior of the cap body to outside of the cap body through the dust passage;

an outer seal projecting into the commutator cavity, the outer seal configured to be spaced radially outward from the commutator.

2. The end cap of claim 1, wherein the outer seal is a ring configured to closely surround the commutator to narrow an airgap with the commutator.

3. The end cap of claim 1, further comprising:

a dust seal projecting into the commutator cavity and configured to axially overlap with the commutator.

4. The end cap of claim 3, wherein the dust seal is a ring that projects axially to narrow an airgap with the commutator, and wherein the dust passage is disposed radially outward of the ring.

5. The end cap of claim 1, comprising a plurality of the dust passages, wherein each dust passage of the plurality of the dust passages extends at least partially within a respective rib of a plurality of ribs of the cap body.

6. The end cap of claim 5, wherein the cap body includes an inner collar and an outer collar, and wherein the plurality of ribs extend between and connect the inner collar and the outer collar.

7. The end cap of claim 1, wherein the cap body comprises an inner collar, and wherein the dust passage extends through the inner collar.

8. The end cap of claim 7, wherein the inner collar comprises:

a bearing collar defining a bearing cavity configured to contain a bearing, wherein the bearing cavity is disposed radially inward of the dust passage.

9. The end cap of claim 8, wherein the commutator cavity has a first diameter, the bearing cavity has a second diameter, and the first diameter is larger than the second diameter, and wherein the dust passage has a third diameter smaller than the second diameter.

10. The end cap of claim 1, wherein the commutator cavity is axially aligned with the dust passage.

11. The end cap of claim 1, including a plurality of the dust passages arrayed about the cap axis, the plurality of the dust passages including:

a first subset of dust passages arrayed partially about the cap axis; and a second subset of dust passages arrayed partially about the cap axis.

12. The end cap of claim 11, wherein: the first subset of dust passages is circumferentially spaced from the second subset of dust passages by a first circumferential gap and a second circumferential gap; and the first circumferential gap is axially aligned with a axial plane through a first brush passage formed in the cap body, the first brush passage configured to at least partially receive a first conductive brush.

13. The end cap of claim 1, wherein the dust passage extends along a passage axis between a passage inlet open to the interior and a passage outlet on the outer side.

14. The end cap of claim 13, wherein the dust passage does not include bends between the passage inlet and the passage outlet.

15. The end cap of claim 13, wherein the passage axis is parallel with the cap axis and radially offset from the cap axis.

16. The end cap of claim 1, wherein an outer aperture is formed through the outer side and aligned on the cap axis, the outer aperture configured such that a drive shaft can extend axially from the interior of the end cap to outside of the end cap through the outer aperture.

17. An end cap for a motor housing of an electric motor, the end cap comprising:

a cap body comprising:

an inner side;

an outer side;

an inner collar at least partially defining a commutator cavity configured to at least partially surround a commutator of the electric motor; and an outer collar disposed radially outward from the inner collar; and a dust passage extending at least partially within the inner collar and from the commutator cavity to the outer side, the dust passage defining a flowpath for brush dust to migrate from the commutator cavity to the outer side;

wherein the inner collar includes a bearing collar defining a bearing cavity configured to contain a bearing, wherein the bearing cavity is disposed radially inward of the dust passage.

18. A brushed direct current electric motor comprising:

a drive shaft configured to rotate on a motor axis;

a commutator mounted on the drive shaft;

at least one conductive brush in contact with the commutator, the commutator configured to rotate relative to the conductive brush; and a motor housing at least partially surrounding the commutator and the drive shaft, the motor housing including:

a wall unit, the wall unit having a first seal;

an end cap disposed at an end of the wall unit; and at least one dust passage;

wherein a commutator cavity exists radially inward of the motor housing and outward of the commutator and axially between the first seal and a second seal, and the at least one dust passage allows passage of dust from the conductive brush to escape from the commutator cavity to outside of the motor housing.

19. An end cap for a motor housing of an electric motor, the end cap comprising:

a cap body having an inner side and an outer side, the cap body disposed about a cap axis and at least partially defining a cap cavity on an interior of the cap body, the cap cavity including a commutator cavity configured to at least partially surround a commutator of the electric motor; and a dust passage extending between the cap cavity and the outer side, the dust passage configured to permit dust to migrate from the interior of the cap body to outside of the cap body through the dust passage; and a dust seal projecting into the commutator cavity and configured to axially overlap with the commutator.

* * * * *